United States Patent [19]

Barclay et al.

[11] Patent Number: 4,702,090
[45] Date of Patent: Oct. 27, 1987

[54] MAGNETIC REFRIGERATION APPARATUS WITH CONDUCTIVE HEAT TRANSFER

[75] Inventors: John A. Barclay, Madison; Walter F. Stewart, Marshall; F. Coyne Prenger; Carl B. Zimm, both of Madison; John P. Parsons, South Milwaukee, all of Wis.

[73] Assignee: Astronautics Corporation of America, Milwaukee, Wis.

[21] Appl. No.: 922,746

[22] Filed: Oct. 24, 1986

[51] Int. Cl.⁴ .............................................. F25B 21/02
[52] U.S. Cl. ........................................................ 62/3
[58] Field of Search ............................................. 62/3

[56] References Cited

U.S. PATENT DOCUMENTS

| | | | |
|---|---|---|---|
| 2,510,800 | 6/1950 | Chilowsky . | |
| 2,619,603 | 11/1952 | Chilowsky | 310/4 |
| 2,648,784 | 8/1953 | Chilowsky | 310/4 |
| 3,108,444 | 10/1963 | Kahn | 62/3 |
| 3,121,265 | 2/1964 | Hoh | 20/62 |
| 3,154,927 | 11/1964 | Simon | 62/3 |
| 3,393,526 | 7/1968 | Pearl | 62/3 |
| 3,413,814 | 12/1968 | Van Geuns | 62/3 |
| 3,743,866 | 7/1973 | Pire | 310/4 |
| 3,774,404 | 11/1973 | Walker et al. | 62/3 |
| 3,841,107 | 10/1974 | Clark | 62/3 |
| 4,033,734 | 7/1977 | Steyert, Jr. et al. | 62/3 |
| 4,069,028 | 1/1978 | Brown | 62/3 |
| 4,107,935 | 8/1978 | Steyert, Jr. | 62/3 |
| 4,332,135 | 6/1982 | Barclay et al. | 62/3 |
| 4,408,463 | 10/1983 | Barclay et al. | 62/3 |
| 4,441,325 | 4/1984 | Bon-Mardion et al. | 62/3 |
| 4,457,135 | 7/1984 | Hakuraku et al. | 62/3 |
| 4,459,811 | 7/1984 | Barclay et al. | 62/3 |
| 4,464,903 | 8/1984 | Nakagome et al. | 62/3 |
| 4,507,927 | 4/1985 | Barclay | 62/3 |
| 4,507,928 | 4/1985 | Johnson | 62/3 |
| 4,509,334 | 4/1985 | Nakagome et al. | 62/3 X |
| 4,554,790 | 11/1985 | Nakagome et al. | 62/3 |
| 4,599,866 | 7/1986 | Nakagome et al. | 62/3 |
| 4,642,994 | 2/1987 | Barclay et al. | 62/3 |

OTHER PUBLICATIONS

T. P. Bernat, et al., Automated Flux Pump for Energizing High Current Superconducting Loads," Rev. Sci. Instrum., vol. 46, No. 5, May 1975, pp. 582-585.

Y. Hakuraku, et al., "Conceptual Design of a New Magnetic Refrigerator Operating between 4K and 20K," Japanese Journal of Applied Physics, vol. 24, No. 11, Nov. 1985, pp. 1548-1551.

Magnetic Refrigeration: The Basis for a New Refrigeration Technology," Los Alamos Laboratory Mini--Review, LALP-82-34, Nov. 1982.

(List continued on next page.)

Primary Examiner—Lloyd L. King
Attorney, Agent, or Firm—Isaksen, Lathrop, Esch, Hart & Clark

[57] ABSTRACT

A magnetic refrigerator has a rotating magnetic wheel which includes a stack of spaced rings of magnetic material. Heat transfer plates of a high temperature heat extractor are interleaved with the magnetic rings and extend to a solid heat transfer conduit which leads to a high temperature terminal. Superconducting magnet coils are mounted to provide a magnetic field through the magnetic wheel at the position of the high temperature heat transfer plates. Low temperature extractor heat transfer plates are positioned outside of the magnetic field and interleave with the rings of the magnetic wheel to transfer heat thereto which is conducted from a low temperature terminal through a solid conduit. As the magnetic wheel is rotated, heat is drawn from a load and conducted through the solid material of the low temperature heat extractor to the magnetic wheel, is released when the material of the wheel is subjected to the magnetic field and transferred to the high temperature heat transfer plates, and is then conducted through the solid material of the heat transfer conduit to the high temperature terminal. Helium gas is sealed in the space surrounding the rotating magnetic wheel to transfer heat between the rings of the wheel and the heat transfer plates. Substantially all heat transfer in the magnetic refrigerator is thus provided by conduction through a solid, allowing start-up of the refrigerator without an initial charge of liquid helium to cool the refrigerator to cryogenic operating temperatures.

43 Claims, 5 Drawing Figures

OTHER PUBLICATIONS

J. A. Barclay, et al., "Experimental Results on a Low Temperature Magnetic Refrigerator," Adv. in Cryogenic Engineering 31, 743 (1986).

Y. Hakuraku, et al., "A Magnetic Refrigerator for Superfluid Helium Equipped with a Rotating Magnetic System," Japanese Journal of Applied Physics, vol. 25, No. 1, Jan. 1986, pp. 140–146.

Y. Hakuraku, et al., "A Rotary Magnetic Refrigerator for Superfluid Helium Production," J. Appl. Phys. 60 (9), Nov. 1, 1986, pp. 3266–3268.

J. A. Barclay, et al., "Magnetic Refrigeration for 4–20K Applications," Los Alamos National Laboratory Report LA UR–84–540, Dec. 1983, Flight Dynamics Laboratory, Air Force Wright Aeronautical Laboratories Report AFWAL-TR-83-3210, Air Force Systems Command Wright–Patterson Air Force Base, Ohio, 54533 (this report is subject to export control laws).

Patent application Ser. No. 848,001, by John A. Barclay, Walter F. Stewart, Michael D. Henke, and Kenneth E. Kalash, entitled "Magnetic Refrigeration Apparatus with Belt of Ferro or Paramagnetic Material", filed with U.S. Patent and Trademark Office on May 27, 1986.

MAGNETIC REFRIGERATION APPARATUS WITH CONDUCTIVE HEAT TRANSFER

FIELD OF THE INVENTION

This invention pertains generally to the field of heat transfer and refrigeration apparatus and particularly to magnetic refrigerators.

BACKGROUND ART

Present refrigeration systems, including those for cryogenic applications, are almost entirely based on successive compression and expansion cycles of a gas. Generally, the efficiency of practical gas cycle refrigerators is only a fraction of the ideal Carnot cycle efficiency, and the efficiency generally decreases with a decrease in the size of the refrigerator. The efficiency of gas cycle refrigerators is particularly low at cryogenic temperatures, e.g., in the 2 Kelvin (K) to 20K range.

It has long been known that certain magnetic materials exhibit the magnetocaloric effect: they increase in temperature when placed in a magnetic field and decrease in temperature when removed from the field. Application of a magnetic field to such solid magnetic materials is analogous to compressing a gas (producing an increase in temperature), and removing the field from the solid is analogous to expanding a gas (producing a decrease in temperature). Thus, it has been recognized that a thermodynamic refrigeration cycle can be achieved using a magnetic material as the working material in a manner analogous to the refrigeration cycles of a gas. Examples of relatively recent designs proposed for magnetic refrigerators are shown in U.S. Pat. Nos. 4,033,734, 4,069,028, 4,107,935, 4,332,135, 4,392,356, 4,408,463, 4,441,325, 4,457,135, 4,459,811, 4,464,903, 4,507,927, and 4,507,928.

As a general rule, the effective temperature range of the magnetocaloric effect for any magnetic solid is considerably more limited than the working temperature range for gases. Typically, a magnetic refrigerator using a single magnetic material has a characteristic useful temperature range on each side of its magnetic ordering temperature $T_0$, beyond which the material becomes either magnetically saturated or weakly magnetic. However, large temperature differentials between the ambient and the cooled medium can be obtained by utilizing cascaded magnetic refrigerators, each using a material with an appropriate magnetic ordering temperature.

The magnitude of the magnetocaloric effect in a given material depends directly on the magnitude of the magnetic field applied to the material. To take full advantage of the magnetocaloric effect requires very high magnetic fields, preferably several Tesla, thus usually dictating that superconducting magnets be utilized rather than less efficient normal conducting magnets. Prior designs for magnetic refrigerators have typically required liquid helium baths to cool the superconducting magnet windings below the critical temperature of the superconductor used. Thus, such refrigerators require initial priming with liquid helium before they can be operated. In addition to the need to provide liquid helium to the refrigerators for cooling of the superconducting coils, the heat transfer mechanisms of most proposed magnetic refrigerators have required the pumping of a gas or liquid to achieve heat transfer. As an alternative to active heat transfer in magnetic refrigerators by a gas or liquid, it has been proposed to use heat pipes which transport heat by an evaporation-condensation cycle of a fluid—helium or hydrogen for refrigerators operating below 20K.

The need to have liquid helium available before cryogenic magnetic refrigerators can be started up can be a significant disadvantage, particularly where the magnetic refrigerator is designed to operate as a stand-alone device away from other cryogenic refrigeration equipment which could be a source of liquid helium, for example in space flight applications. The ability to start up without liquid helium is also desirable for equipment which may be used intermittently or periodically, such as medical equipment which requires cooling of superconducting magnets, and where it is inconvenient or expensive to obtain and store liquified helium in preparation for the start-up of the machine.

The use of high field superconducting magnets to produce the most efficient magnetic refrigeration imposes substantial mechanical loads on the support structure of the refrigerator. The support structure must be sufficiently massive and rigid to resist the forces imposed without substantial deformation, and yet must not constrain the mechanical operation of the magnetic refrigerator or create a significant thermal addenda with consequent loss of refrigeration efficiency, and must not permit undue heat transfer between hot and cold regions.

SUMMARY OF THE INVENTION

The magnetic refrigeration apparatus of the present invention utilizes heat transfer by conduction primarily through solid conductors rather than by convection. Consequently, the refrigeration apparatus operates without the need for pumps or heat pipes. The apparatus is particularly adapted to operation at low cryogenic temperatures, in the 2K to 20K region, wherein the magnetic field for the apparatus is provided by superconducting magnets. Because all heat transfer in the apparatus may be accomplished by conductive heat transfer primarily through solids, cryogenic operation of the refrigerator may be obtained without the need for priming with liquid helium since the refrigerator may be brought down to temperatures below the critical temperatures of the superconducting coils without utilizing liquid helium to initially cool the coils.

The apparatus of the invention includes a wheel of paramagnetic or ferromagnetic material which rotates so as to bring all points on the wheel periodically into and out of a strong magnetic field produced by the superconducting magnets. When entering the magnetic field at a high temperature heat transfer region, the magnetic material in the wheel increases in temperature and rejects heat to heat transfer plates of a heat extractor which transfers the heat by conduction through a solid conductor conduit to a high temperature interface terminal which may be connected to a cold terminal of another refrigerator or other heat sink. When a portion of the wheel leaves the magnetic field, it decreases in temperature and passes to a low temperature heat transfer region where heat is transferred to the material of the wheel from heat transfer plates of a low temperature extractor which transfers heat by conduction in a solid conduit from a low temperature terminal of the refrigerator to the heat transfer plates. The plates of the high and low temperature extractors are separated from the magnetic wheel by a small space which is filled with helium gas such that transfer of heat across the gap takes place by conduction through the helium. A very small spacing is maintained between the stationary heat transfer plates and the rotating wheel to maximize the rate of transfer of heat across the helium gap and minimize motion of the helium gas. Transfer of heat is thus obtained from the low temperature interface terminal to the high temperature interface terminal almost entirely by conduction in a solid, with transfer taking place across a non-solid gap only between the rotating wheel and the heat transfer plates.

To achieve high efficiency in the conductive transfer of heat, the heat extractors of the refrigerator include central stationary heat conductor conduits formed of a good conductor at cryogenic temperatures, such as copper, one extending along the central axis from a low temperature terminal toward the center of the refrigerator, and the other extending from the high temperature terminal along the central axis toward the center, approaching but not touching the low temperature conduit so that thermal isolation between them is maintained. The transfer plates of the high and low temperature extractors are preferably formed as multiple conductive plates, preferably integral with their respective conduits, which extend out radially from the central position of the apparatus with the low temperature plates and the high temperature plates disposed at angularly separated positions about the central axis. The magnetic wheel is preferably formed with plural rings of magnetic material secured to an outer rim in stacked, spaced relation so as to interleave with the plural transfer plates of the high and low temperature extractors.

The superconducting magnets are preferably formed as solenoids disposed above and beneath the magnetic wheel so that portions of the wheel cyclically come through the magnetic field between the solenoidal magnets. In a preferred structure, two sets of superconducting magnets are provided on opposite sides of the refrigerator central axis such that each portion of the magnetic wheel is passed through a magnetic field twice for each revolution of the wheel. Correspondingly, two sets of high and low temperature transfer plates are formed, disposed at 90° angles to one another, with the high temperature transfer plates extending under the magnets and the low temperature transfer plates extending at orthogonal positions where no substantial magnetic field exists. Flux concentrating bars of highly permeable material such as soft iron preferably bridge the ends of the solenoids so that the flux path extends from one set of solenoid magnets to the other. To resist the strong forces exerted by the magnetic field on the superconducting magnets, the magnets are preferably supported by an external spherical shell-type support structure which is engaged to the magnets at the top and bottom of the shell to restrain the attractive forces exerted between the magnets.

To achieve cooling of the magnets, it is preferred that a conductive link be formed between the low temperature extractor conduit of the device and the superconducting magnets, so that these magnets may be cooled by pure conduction without the need to bathe the magnets in liquid helium. It is a particular advantage of the present invention that the magnetic refrigerator may be started up without the need initially to charge this system with liquid helium. This may be accomplished by initially operating a gas-cycle refrigerator to bring the high temperature interface terminal of the refrigerator down to a temperature near or below the critical temperature of the superconductors in the magnet coils, for example about 15K to 20K where $Nb_3Sn$ superconductor having an 18K critical temperature is used. By providing residual magnetism in the magnets, e.g., by providing permanent magnets within the superconducting magnets or by initially charging the superconducting magnets to provide a small initial magnetic field, the magnetic refrigerator can be operated to cool down the low temperature transfer conduit beneath the temperature of the high temperature terminal, eventually reaching a temperature below the critical temperature of the superconductor at the field then applied to the coil. Once the superconductor is below its critical temperature, the current in the superconductor may be increased, for example, by utilizing a flux pump, to bring the field of the coil to a higher level which is still below the field at which the superconductor would go normal. The magnetic refrigerator continues to operate to draw the superconducting magnets down to a lower temperature at which even greater current can be carried (and greater fields produced) without driving the superconducting coils normal. By proceeding in steps in this manner, the superconducting coils can be brought up to their maximum current level at which sufficient magnetic field is produced to allow the refrigerator to attain temperatures at the low temperature terminal in the 2K to 6K range.

Further objects, features, and advantages of the present invention will be apparent from the following detailed description when taken in conjunction with the accompanying drawings.

DESCRIPTION OF THE PREFERRED EMBODIMENT

Figure 1:
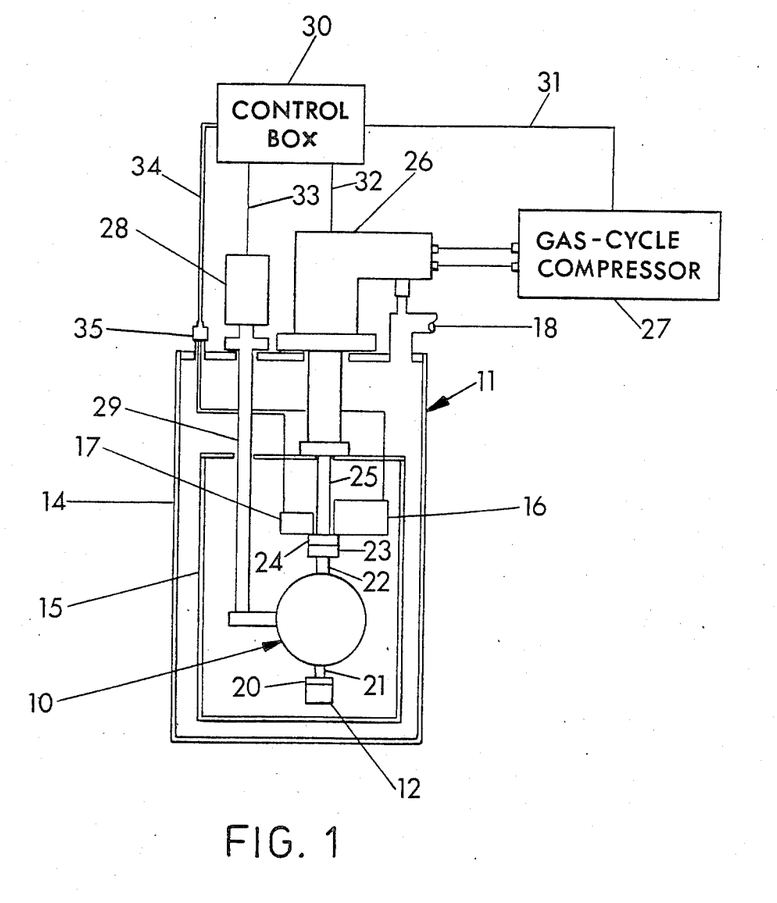
FIG. 1 is a schematic view of a refrigeration system incorporating the magnetic refrigerator of the present invention.

With reference to the drawings, the magnetic refrigeration apparatus of the present invention is shown schematically at 10 in FIG. 1 forming part of a cooling system 11 operative to cool down a load 12, e.g., cooling boil-off helium gas, to temperatures near absolute zero, e.g., 2K to 6K. The entire magnetic refrigerator 10 will have the structural parts thereof cooled down to cryogenic temperatures, e.g., below 20K, and to thermally shield the refrigerator 10 from the ambient atmosphere, the refrigerator is enclosed in a Dewar shell 14 and is surrounded by a thermal shield 15, formed, for example, of copper or aluminum preferably covered with layers of metal coated plastic or superinsulation. The interior of the Dewar shell 14 is evacuated to minimize heat transfer by convection from the walls of the Dewar to the magnetic refrigerator 10 and the load 12, as well as to the other components of the system maintained within the Dewar. These components include a flux pump 16 which serves to supply electrical energy to the magnet coils of the magnetic refrigerator and a helium gas supply 17 which controls the supply of gas to the magnetic refrigerator, as explained further below. A vacuum pump-out port 18 is provided in the Dewar shell 14 to provide connection from a vacuum pump to the interior of the Dewar shell 14.

The magnetic refrigerator 10 causes heat to be transferred from the load 12 to a low temperature interface terminal 20 and thence through a low temperature heat extractor 21 into the magnetic refrigerator 10. The refrigerator 10 transfers this heat to a high temperature heat extractor 22 and thence to a high temperature interface terminal 23. The terminal 23 may be held in contact, as shown in FIG. 1, with the cold plate 24 at the end of the bottom section 25 of another refrigeration system 26. The heat is removed from the plate 24 upwardly in the gas cycle refrigerator 26 and is discharged to ambient atmosphere. The refrigerator 26, driven by a compressor 27, is capable of reducing the cold plate 24 to a temperature near the upper temperature limit of operation of the magnetic refrigerator 10. For example, the refrigerator 10 may be formed to withdraw heat from a load at 2K to 6K and transfer it to the cold plate 24 maintained by the gas cycle refrigerator 26 at a temperature in the range of 20K The mechanical power for operating the magnetic refrigerator 10 is provided from a drive motor 28 outside the Dewar shell 14 which has a drive shaft extending through an enclosing pipe 29 to the magnetic refrigerator 10. It is preferable that the drive motor 28 be maintained outside the Dewar shell to allow ready servicing and replacement of the motor as necessary, and to isolate the cold components of the system as far as possible from the heat given off by the drive motor 28. The various components of the system are controlled during start-up, constant temperature operation, and shut-down by a controller 30 which has control lines 31-34 extending to the various components of the system. One of the control lines 34 extends through an instrumentation port 35 in the Dewar shell 14 and provides power to the flux pump 16 and also provides connection to various sensors within the Dewar (not shown) to allow the controller to determine refrigerator conditions, such as the temperature and pressure of the components within the Dewar.

The foregoing system is particularly advantageous in cooling the load 12 down to the low cryogenic temperatures, since gas cycle refrigerators are extremely inefficient at such very low temperature ranges. By combining a gas cycle refrigerator 26, which allows medium cryogenic temperatures to be obtained, e.g., in the 20K to 30K range, with a magnetic refrigerator 10 utilized to provide refrigeration over the more limited range from 20K down to 2K to 6K, improved efficiency is obtained. However, it is noted that multiple stages of magnetic refrigerators could be utilized in place of the gas cycle refrigerator 26, each one of which spans a limited temperature range, for example 40K to 60K The arrangement of parts within the magnetic refrigerator 10 is illustrated in the cut-away view of FIG. 2 and the cross-sectional view of FIG. 3. The refrigerator apparatus 10 is suspended by support posts 38 from a suspending support structure 37, as shown in FIG. 3, within the Dewar 14, with the posts 38 engaged to a flat, circular top support plate 39. The support structure also includes a generally spherical outer support shell including an upper hemispherical shell section 41 engaged at the top to the plate 39, a lower hemispherical shell section 42 engaged to a circular, flat bottom support plate 43, and joint flanges 44 and 45 which engage the hemispherical shells 41 and 42, respectively and fit together at a medial joint. Solenoid magnets 47 and 48, formed of coils of superconducting wire, are supported from the top plate 39 by rods 49 secured by flanged bolts 50 to the top plate. Similarly, solenoid magnets 52 and 53 are disposed beneath the magnet coils 47 and 48, respectively, and are each formed of coils of superconducting wire. The current in the coils 47 and 52 flows in the opposite sense to the current flowing in the coils 48 and 53. The coils 52 and 53 are both secured in position by rods 54 which are mounted to the lower support plate 43 by flanged bolts 55. A flux concentrating bar 57 of high permeability material, for example, soft iron, extends between the tops of the coils 47 and 48 and is held in place by the rods 49 which mount the coils 47 and 48 to the top support plate 39. Similarly, a flux concentrating bar 58 of high permeability material is mounted between the coils 52 and 53 and the lower support plate 43 and is held in place by the rods 54. The flux return bars 57 and 58 provide a high permeability flux path between the coils 47 and 48 and between the coils 52 and 53, respectively, such that the magnetic flux produced by the four superconducting coils travels in a circuit through each of the coils, returning between the laterally spaced coils by the flux concentrating bars 57 and 58. A plate of heat conducting material 60 is mounted to the bottoms of the superconducting magnets 47 and 48 to act as a heat extractor for the magnets. Similarly, a conducting plate 61 is mounted to the top ends of the superconducting magnets 52 and 53 to provide heat extraction from these magnets. As explained further below, the magnet heat extractor plates 60 and 61 transfer heat away from the superconducting magnets by conduction to the low temperature heat transfer conduit to maintain the magnets at a temperature below the critical superconducting temperature. The superconducting magnets 47, 48, 52 and 53 are thus primarily supported by the external support structure and each magnet coil in the pairs 47, 52 and 48, 53 is suspended away from the other in the pair to provide an unimpeded space between the magnets.

The high temperature heat extractor 22 includes a heat transfer conduit 62 which extends downwardly from the high temperature terminal 23 through openings in the top plate 39 and flux concentrating bar 57 and thence between the superconducting magnets 47 and 48. Similarly, as shown in FIG. 3, the low temperature heat extractor 21 includes a heat transfer conduit 63 which extends upwardly from the low temperature terminal 20 through openings in the lower support plate 43 and lower flux concentrating bar 58 and thence between the superconducting magnets 52 and 53. The heat transfer conduits 62 and 63 both preferably extend generally along the central axis of the refrigerator 10 and approach, but do not contact one another near the center of the refrigerator.

The high temperature conduit 62 includes two substantially horizontally extending portions 64 which terminate in a plurality of vertically stacked and separated heat transfer plates 65. As best shown in the full cross-sectional view of FIG. 3, the vertically extending portion of the high temperature conduit 62, the horizontal portions thereof 64 and the plates 65 are formed of a solid material which is a good heat conductor at the temperature of operation of the refrigerator and provide a continuous heat transfer path through the solid.

For example, at cryogenic temperatures between 2K and 20K, highly refined copper (e.g., OFHC copper certified grade No. 101) has been found to be an excellent heat conductor and is preferably the material of which the high temperature extractor portions 62, 64 and 65 are formed. Very high purity aluminum may also be utilized for cryogenic operation if desired, and other materials may be used, as appropriate, in other operating temperature ranges. The various parts of the heat extractors may be formed as a unitary integral structure or may be formed as an assembly of several parts which are welded together to provide a continuous heat transfer path through the heat extractor. Disposed in the spaces between the stacked plates 65 are plural thin flat rings 67, three shown, of a magnetic material which is chosen to exhibit the desired magnetocaloric effect at the temperature of operation of the magnetic refrigerator 10. The rings 67 are tightly held in slots in an outer circular rim 68 which is preferably formed of a material which is a poor heat conductor at cryogenic temperatures, for example, titanium alloys or stainless steel. The rings 67 may be press fit into the slots and bonded therein using a liquid adhesive (e.g., a filled epoxy) injected through radial injection holes into a small space at the outer periphery of the rings 67. A flange ring gear 69 is affixed on the outer periphery of the rim 68 and terminates in peripheral gear teeth 70 which extend around the entire circular periphery of the flange 69. Together, the magnetic rings 67, the rim 68 which holds them in place, and the flange ring gear 69, form a magnetic wheel unit 71 which is mounted for rotation by a bearing 72 engaged between the rotatable magnetic wheel unit 71 and a wheel housing 74. Since the bearing rotates through the magnetic field, it is preferably made of a non-magnetic material, e.g., monel metal. The wheel housing 74 is affixed at its inner circular peripheral edge to the horizontal portions 64 of the conduit 62 and sealed thereto by a sealing groove and indium wire seal 75, or other appropriate seal, and is supported at its outer circular peripheral edge by flanges 76 mounted to the support structure flanges 44 and 45. A top cover plate 77 of circular disk shape is affixed at its inner peripheral edge to the top of the horizontal extending portions 64 of the conduit 62 and sealed thereto by a groove and indium wire seal 78, and is sealed at its outer peripheral edges to the flange portion 76 of the wheel housing. The magnetic wheel unit 71 is thus sealed between the wheel housing 74, the high temperature heat transfer conduit 62, and the cover plate 77. The magnetic wheel unit 71 is rotated by means of a drive shaft 79, turned by the motor 28, which rotates a drive gear 80 having teeth thereon which engage the teeth 70 on the ring gear 69. The gear 80 is mounted within a housing formed of an upper housing portion 81 which is sealed to the upper cover portion 77 and a lower housing portion 82 which is sealed to the wheel housing 74. A bearing 83 is mounted in the housing 82 and engages the end of the drive shaft 79 to support the shaft for rotation about a vertical axis. An insulated and sealed coupler 84, for example, a magnetic coupler, may be used to couple the drive torque from the motor 28 to the lower shaft 79.

Figure 2:
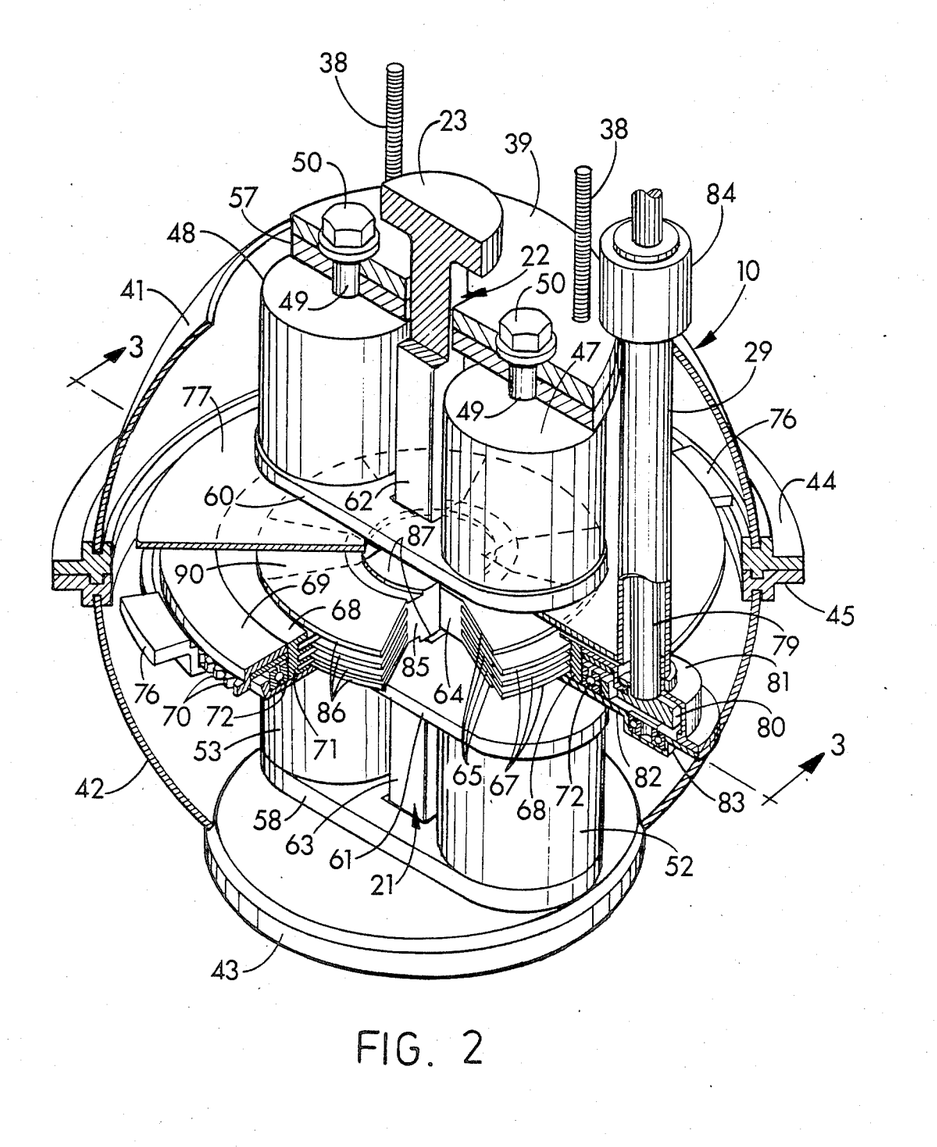
FIG. 2 is a perspective view of the magnetic refrigerator of the invention with portions thereof cut away to show the interior construction of the refrigerator.
Figure 3:
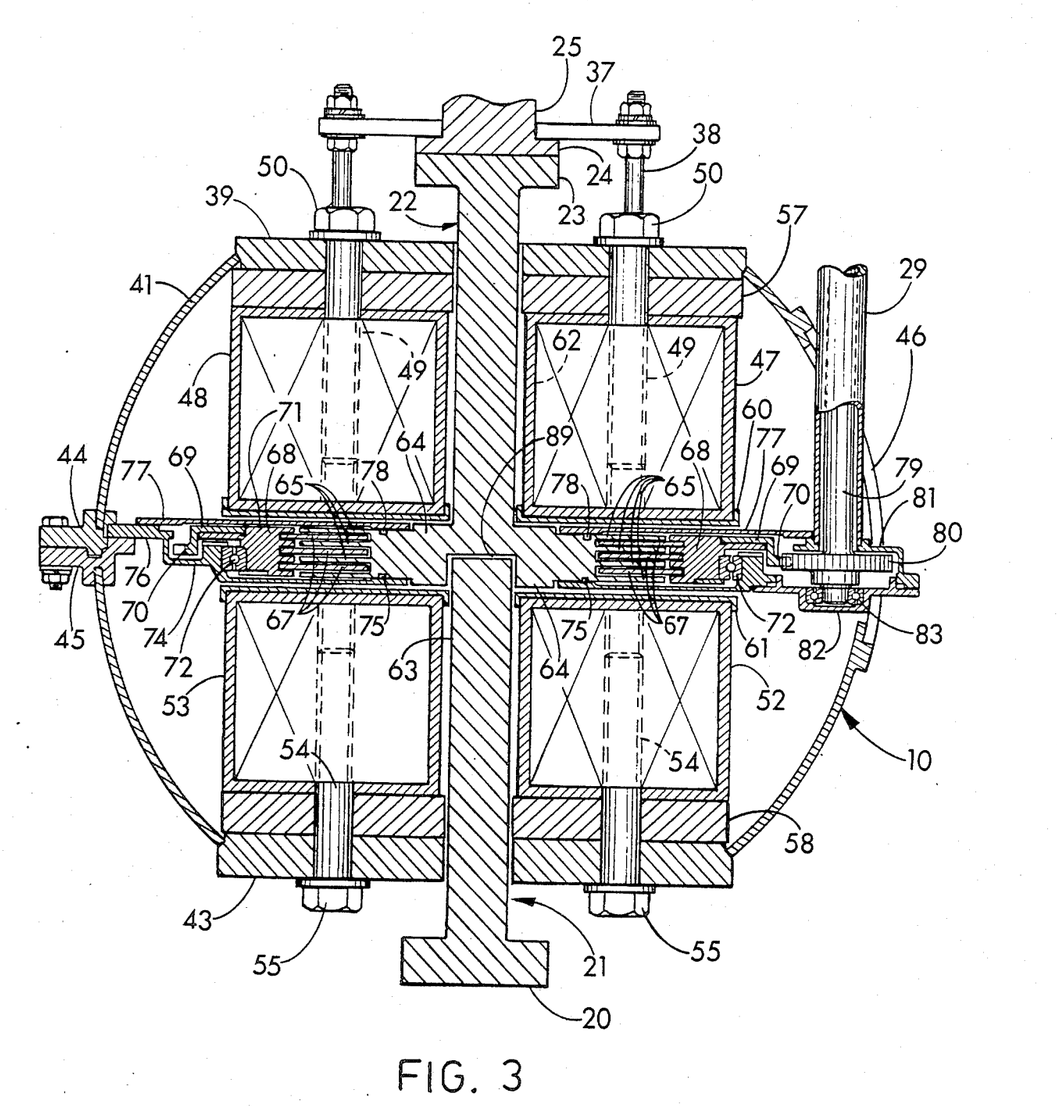
FIG. 3 is a cross-sectional view through the magnetic refrigerator taken generally along the lines 3—3 of FIG. 2.

The low temperature heat transfer conduit 63 also has central horizontally extending portions 85, one of which is shown in FIG. 2, which are substantially similar to the horizontally extending portions 64 of the high temperature heat extractor conduit 62 and are at positions rotated 90° with respect to the horizontally extending portions 64. A plurality of heat transfer plates 86 extend from the horizontally extending portions 85 in vertically stacked spaced relation, substantially identically to the manner of arrangement of the plates 65 for the high temperature extractor 22, with the spacing between the plates 86 being occupied by the rings 67 of magnetic material. A raised section 87 is formed on the top and bottom of each of the extending portions 85. The raised sections 87 are in firm, heat transfer contact with the magnet heat extractor plates 60 and 61 and thus provide a continuous heat extraction path from the superconducting coils to the low temperature heat transfer conduit. As best shown in FIG. 3, the central inner portions of the high temperature conduit 62 and the low temperature heat transfer conduit 63 are spaced apart a short distance defining a separation space 89 where the two conduits are adjacent to one another. The low temperature conduit 63—including the vertical portion thereof extending along the central axis of the refrigerator and the horizontally extending portions 85—and the heat transfer plates 86 preferably form a continuous heat transfer path with one another and are made of a solid material which is a good heat conductor at cryogenic temperatures, for example, highly refined copper.

Figure 4:
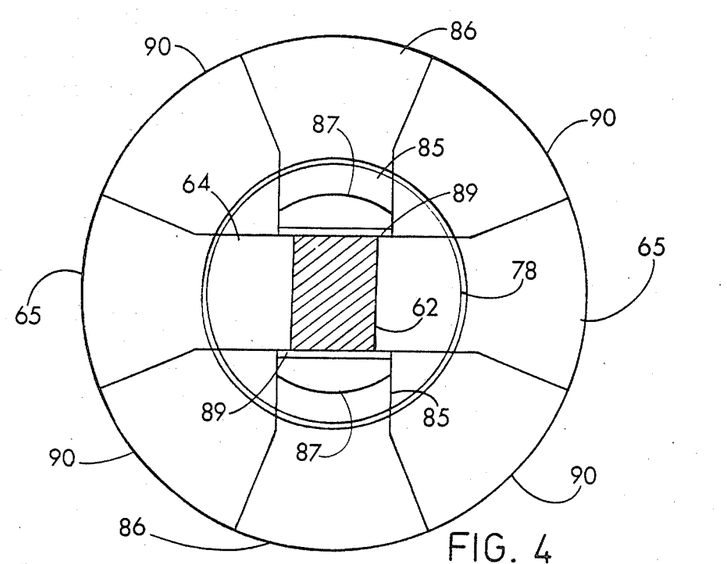
FIG. 4 is a top view of the high and low temperature heat transfer plates of the high and low temperature extractors.

The areas between the horizontally extending conduit portions 64 and plates 65 of the high temperature heat extractor 22 and the horizontally extending portions 85 and plates 86 of the low temperature heat extractor are occupied by wedge shaped insulating plates 90, as shown in FIG. 4. The insulating wedge plates 90 are interposed between the adjacent plates 65 and 86 and are spaced vertically apart to allow the magnetic rings 67 to pass between them. The insulating plates 90 are formed of a material that is a poor heat conductor at cryogenic temperatures and has good structural properties. Stainless steel (e.g., 310 stainless steel) is found to be a particularly advantageous material for the plates 90 since it has excellent structural strength and a linear coefficient of expansion similar to copper but is a relatively poor conductor of heat at temperatures near absolute zero, and thus serves to insulate the high temperature heat transfer plates 65 from the low temperature heat transfer plates 86. Other suitable materials, such as titanium alloy (e.g., Ti-6Al-4V), may also be used. As best illustrated in FIG. 2, the upper closure plate 77 is sealed to the top of both the insulating wedge plates 90 and the extending portions 85 of the low temperature extractor, and thereby completely seal the rotating magnetic wheel 71 from the space surrounding the magnetic refrigerator. The volume that is sealed and within which the magnetic wheel rotates is filled with a heat transfer gas, preferably either helium 3 or helium 4, which acts to transfer heat between the extractor plates 65 or 86 and the magnetic rings 67 by conduction and convection, as explained further below. The plates 65, 86 and 90 are preferably of the same thickness, which may be chosen to provide a desired combination of heat transfer efficiency and structural strength, and are preferably welded together to form an integral structure. Plate thicknesses in the range of 0.03 to 0.15 inch have been found satisfactory for cryogenic operation, although other dimensions may be utilized, if desired. Because the plates 90 provide a structural connection between the high and low temperature heat extractors 22 and 21, the weight of both extractors may be supported by attaching the high temperature terminal 23 to the cold plate 24 of the gas cycle refrigerator. This type of support avoids the need for strong structural connections of the extractors to the outer support shell.

Figure 5:
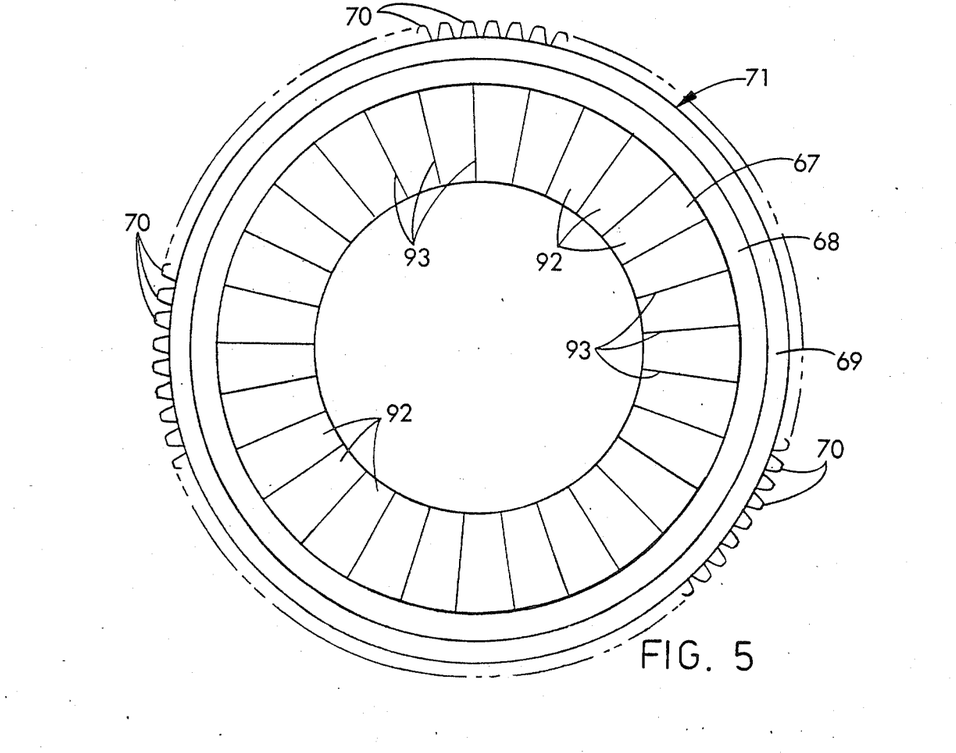
FIG. 5 is a top plan view of the magnetic wheel portion of the apparatus of the invention.

A preferred construction for the magnetic rings 67 is illustrated in FIG. 5, in which the ring 67 is formed of a plurality of separate segments 92. The joints 93 between the separate segments may be packed with an insulating material (e.g., low temperature epoxy) or, preferably, formed so that the segments are spaced slightly apart with the space between the segments filled with the ambient helium gas to provide an effective thermal break between the segments. Utilization of numerous separated segments in the magnetic ring 67 is preferred since this construction minimizes the transfer of heat between segments as the magnetic wheel rotates and portions of the magnetic rings enter and leave the magnetic field. It is preferred that the temperature differential between the parts of the magnetic material in and out of the magnetic field be as great as possible, and thus it is desirable to minimize the conductive heat transfer around the circumference of the rings.

There are numerous materials which may be utilized for forming the rings 67. See, for example, the various materials listed in U.S. Pat. No. 4,408,463, to Barclay, the disclosure of which is incorporated herein by reference. A preferred material is gadolinium gallium garnet which has satisfactory magnetocaloric effect properties at low cryogenic temperatures, particularly in the 2K to 20K range, and satisfactory thermal and structural properties. In particular, with gadolinium gallium garnet incorporated in a ceramic structure of reasonable dimensions—for example, approximately one eighth-inch thickness for the segments of the magnetic rings 67—adequate axial heat conduction through the material is obtained so that heat is efficiently transferred to and from the material as it exits and enters the magnetic field. For materials such as gadolinium gallium garnet, is it particularly desirable to utilize the segmented magnetic rings as illustrated in FIG. 5, either spaced apart or filled with a heat insulator at the joints such as epoxy, since the material might otherwise transfer heat around the ring at potentially unacceptable rates. Alternatively, a porous structured gadolinium gallium garnet which has lower thermal conductivity could be utilized.

As described above, the rotating magnetic wheel 71 is sealed off by the lower housing 74 and upper cover plate 77 from the surrounding space, and the interior volume is filled with helium, either helium 3 or helium 4, at a desired optimum pressure, preferably about 1.5 atmospheres for helium 3. A particular advantage of the preferred embodiment described above, in which the magnetic wheel 71 rotates about stationary heat extractors 21 and 22, is that the total volume of helium sealed about the rotating wheel can generally be made smaller than would be required for a centrally rotating wheel surrounded by stationary heat extractors. To maximize the rate of heat transfer across the gap between the magnet rings 67 and the heat transfer plates 65 and 86, the gap spacing is preferably as small as possible. It has been found that satisfactory heat transfer is obtained with a gap spacing in the range of one to ten thousandths of an inch, without the need to provide active convection or pumping of the helium to effect heat transfer. Flexible wiper seals may also be mounted in the gaps, if desired, to impede circumferential gas flow.

The magnetic refrigerator 10 of the invention is well adapted for operation in the low cryogenic temperature range, for example transferring heat from a refrigeration load 12 at a temperature of approximately 4K to the high temperature interface terminal 23 at a temperature of approximately 15K or higher. The speed of rotation of the magnetic wheel may be chosen to optimize the relationship between heat transfer and efficiency. Every quarter revolution of the magnetic wheel results in an interchange of the position of any one of the magnetic material segments 93 in the rings 67 from a high temperature transfer region in a high magnetic field to a low magnetic field in a low temperature transfer region, at which the segment may be at a temperature of 2K to 4K. Adequate time must be provided for transfer of heat between the magnetic ring segments 92 and the heat transfer plates 65 or 86. For a refrigerator 10 having the exemplary dimensions described above, a speed of 10 to 30 revolutions per minute has been found satisfactory.

Of particular significance is that gaseous supercritical helium, either helium 3 or helium 4, may be utilized as the heat transfer medium to allow operation down to a nominal load temperature of 4.2K, with the capability of cooling the load down to temperatures as low as 2K. Helium 4 must be maintained at a pressure of at least 2.2 atmospheres below 4.2K and may not be used below 2.2K because of superfluid transitions. Helium 3 is advantageous as a heat transfer medium because it allows operation at lower temperatures and pressures. To avoid having to charge and discharge the sealed space about the rotating magnetic wheel 71 during cooldown and warmup of the magnetic refrigerator, the helium gas supply 17 includes an auxiliary charcoal canister which may be connected to the sealed magnetic wheel enclosure space by a valve (not shown) such that helium remains trapped in the charcoal canister until cooldown of the machine to near operating temperatures is obtained, e.g., by operation of the gas cycle refrigerator 26 to bring the temperature of the magnetic refrigerator down to approximately 20K to 15K. At this temperature, the valve may be opened to bring the canister, containing helium trapped in charcoal, into communication with the enclosure space and the charcoal may then be heated to drive helium into the enclosure space until a desired pressure is reached, and the valve may be closed to cut the canister off from communication with the enclosure space to allow continuation of the cooldown of the refrigerator. Conversely, during warm-up of the refrigerator, the charcoal canister 17 may again be brought into communication with the enclosure space so that as the refrigerator heats up, the helium is driven into the charcoal canister and trapped in the charcoal such that the pressure of the helium in the enclosure space remains relatively constant and does not reach an excessively high pressure. By utilizing the auxiliary charcoal canister 17, the wheel housing 74 and cover plate 77 need not be built to withstand extremely high pressure differentials. In addition, by providing a self-contained supply of helium for the refrigerator in this manner, it is not necessary to charge the refrigerator with helium gas from an external source during start-up.

A particular advantage of the totally conductive heat transfer construction of the present invention is that start-up of the refrigerator and cool-down to cryogenic temperatures is obtainable without the need for liquid helium. For example, the start-up cycle can be initiated by operating the gas cycle refrigerator 26 until the cold plate 24 of the gas cycle refrigerator and the interfacing terminal 23 of the magnetic refrigerator are at the low end of the operating temperature of the gas cycle refrigerator, e.g., about 15K to 20K. The enclosed space about the magnetic wheel 71 may then be charged to provide helium to the space at the desired pressure, and the drive motor 28 may initiate operation to begin rotation of the magnetic wheel.

It is preferred that the coils of the superconducting magnets 47, 48, 52 and 53 be formed of a superconducting material that has a critical temperature near or above the terminal temperature provided by the gas cycle refrigerator. One suitable superconductor is niobium-3 tin ($Nb_3Sn$), which has a zero field critical temperature of approximately 18K. Thus, by lowering the temperature of the coils of the magnetic refrigerator 10 below the critical temperature, e.g., to approximately 15K, the coils can be operated in the superconducting state. Current can be provided to the coils in various ways, for example, by utilizing a flux pump apparatus 16 which provides an inductive coupling between an external primary coil and a one or two turn secondary superconducting coil for the solenoidal coils 47, 48, 52 and 53. An example of a suitable flux pump system is described in the article entitled "Automated Flux Pump for Energizing High Current Superconducting Loads," Rev. Sci. Instrum., Vol. 46, No. 5, May 1975, pp. 582-585, incorporated herein by reference. By inducing a relatively small current in the solenoid coils which produces a magnetic field below the critical field strength at the existing temperature of the coils, the magnetic refrigerator can begin drawing down the temperature of the low temperature extractor 21, thereby cooling down the solenoidal coils by the action of the magnetic heat extractor panels 60 and 61 conductively connected to the heat transfer conduit 63. The temperature to which the low temperature extractor may be lowered is directly related to the strength of the magnetic field produced by these solenoidal coils; thus, the initial low current level induced in the coils is capable of reducing the temperature of the coils a few degrees. As the coils are cooled, higher currents may be induced in the coils utilizing flux pumping, as the cooled coils are capable of maintaining the superconducting state at higher current and thereby higher field levels. By stepwise operation in this manner—operating the refrigerator to cool down the coils to a lower temperature, and then inducing a higher current level in the coils—, the magnetic refrigerator may be cooled down to a temperature at which the coils may be operated at their maximum desired magnetic field. At the maximum field strength from the coils, the refrigerator is capable of achieving its lowest temperature range in which the low temperature interface terminal 20 may be drawn down to the 2K to 4K range.

As an alternative to an initial charging of the superconducting coils to produce a magnetic field, auxiliary permanent magnets having a relatively low field strength, may be mounted within the coils 47, 48, 52 and 53 (for example, forming the rods 49 and 54) to provide a magnetic field through the magnetic wheel 71 even when no current is flowing in the coils. By using such permanent magnets, the magnetic refrigerator 10 may start operation even above the critical superconducting temperature of the coils. The magnetic field from the permanent magnets allows the refrigerator 10 to draw down the temperature of the cold extractor 21, and therefore the temperature of the superconducting coils, below the critical superconducting temperature of the coils. The coils may then be charged to an initial relatively low current level and operation of the refrigerator to step down to the desired final temperature may proceed as described above.

The high current levels in the magnetic solenoid coils 47, 48, 52 and 53 produce extremely high magnetic field induced forces, generally tending to draw the coils 47 and 52 together and the coils 48 and 53 together. These forces are resisted by the rods 49 and 54 attaching the coils to the end plates 39 and 43. The hemispherical shell portions 41 and 42 distribute the forces imposed on the end plates 39 and 43 to the flanges 44 and 45, with the spherical shape of the outer shell portions being preferred because of the relatively high strength of this structure in resisting the essentially compressive forces exerted by the solenoidal coils on the end plates 39 and 43. This spherical shape provides a very solid and rigid structural support for the coils while minimizing the mass of support structure which must be cooled during operation of the refrigerator. An opening 46 with surrounding ridge is formed in the outer shell to allow admittance of the drive shaft 79 and enclosing tube 29, but does not significantly affect the structural rigidity of the overall structure inasmuch as the mechanical loads are distributed about the opening 46 through surrounding areas of the shell 41.

The magnetic refrigerator 10 has been illustrated using two pairs of solenoidal coils: a first pair 47 and 52 and a second pair 48 and 53, although it is apparent that only a single pair of solenoidal coils may be utilized, if desired. The two sets of coils illustrated is particularly advantageous inasmuch as the forces imposed by the coils may be balanced across the central axis of the magnetic refrigerator by having an opposite direction of current flow in each pair and a complete flux return path encircling the center of the refrigerator is thus achieved. In addition, the pairs of coils may be operated to provide unbalanced application of magnetic fields to the magnetic wheel at different positions on the wheel, a nonsymmetric field profile which is not generally obtainable with reciprocating refrigerator constructions. To enhance thermodynamic efficiency, it is generally preferable that the field strength as a function of angular position not be perfectly symmetrical. There are several ways in which the field from the superconducting magnets may be made asymmetrical. These include mounting the magnets off center with respect to the extractor heat transfer plates, adding permeable iron plates or wedges beneath the coil to distort the field, and winding the magnets to have an elliptical or a nonsymmetrical shaped cross section rather than circular.

While a refrigerator has been illustrated with respect to a magnetic wheel 71 rotating about fixed, centrally disposed heat extractors 21 and 22, it is apparent that the magnetic wheel could be formed to rotate about a central axis with the heat extractors 21 and 22 disposed about the periphery of the wheel. The embodiment illustrated and described herein is preferred in that the heat transfer path through the solid heat extractor conduits may be achieved with substantially minimum heat transfer length where more than one pair of magnets is utilized and thus where heat transfer to and from the rotating magnetic wheel takes place at more than one position.

It is understood that the invention is not confined to the particular construction and arrangement of parts and method of operation described herein, but embraces all such modified forms thereof as come within the scope of the following claims.

What is claimed is:

1. Magnetic refrigeration apparatus comprising:
   (a) magnetic material which exhibits the magnetocaloric effect mounted for movement;
   (b) means for producing a magnetic field at a position over a portion of the magnetic material such that each point of the magnetic material can be moved into and out of the magnetic field as the material is moved;
   (c) a high temperature heat extractor including a solid conductive heat transfer conduit extending to form a continuous conductive path from a heat transfer plate adjacent to the portion of the magnetic material in the magnetic field to a high temperature interface terminal;
   (d) a low temperature heat extractor including a solid conductive heat transfer conduit extending to form a continuous conductive path from a heat transfer plate adjacent to the magnetic material at a position outside of the magnetic field to a low temperature interface terminal; and
   (e) means for containing a heat transfer gas in the space between the magnetic material and the heat transfer plates such that heat is transferred from the heat transfer plate of the low temperature extractor to the magnetic material through the gas and heat is transferred from the magnetic materal through the gas to the heat transfer plate of the high temperature extractor conduit.

2. The apparatus of claim 1 wherein the magnetic material is in the form of a wheel and including means for driving the magnetic wheel in rotation.

3. The apparatus of claim 2 wherein the magnetic wheel is comprised of a plurality of flat rings of magnetic material each mounted to a surrounding holding rim which maintains the magnetic rings in stacked spaced relation, and wherein the high temperature heat extractor includes a plurality of heat transfer plates positioned to interleave with the magnetic rings of the magnetic wheel at a high temperature heat transfer region and wherein the low temperature extractor includes a plurality of heat transfer plates positioned to interleave with the magnetic rings at a low temperature heat transfer region.

4. The apparatus of claim 3 wherein the heat transfer plates and the heat transfer conduit of the high temperature extractor are integrally formed of a solid material which is a good conductor of heat at cryogenic temperatures, and wherein the low temperature heat transfer plates and low temperature heat transfer conduit are integrally formed of a material which is a good conductor of heat at cryogenic temperatures.

5. The apparatus of claim 4 wherein the high and low temperature heat extractor conduits and high and low temperature heat transfer plates are formed of high purity copper.

6. The apparatus of claim 3 wherein the magnetic rings are divided circumferentially into numerous individual segments, each insulated from one another.

7. The apparatus of claim 5 wherein the material of the magnetic rings is gadolinium gallium garnet.

8. The apparatus of claim 2 wherein the means for producing the magnetic field includes two pairs of solenoidal coils formed of superconducting windings, the solenoidal coils of each pair disposed on opposite sides of the rotating magnetic wheel with the pairs being disposed on opposite sides of the axis of rotation of the wheel such that any portion of the magnetic wheel will be subjected to a magnetic field twice for each cycle of rotation of the wheel.

9. The apparatus of claim 8 including means for providing a heat conductive connection between the superconducting coils and the low temperature extractor such that the superconducting coils are cooled by conduction through a solid material to the low temperature extractor conduit.

10. The apparatus of claim 8 including a support structure having a top hemispherical support shell having a flat top support plate, a bottom hemispherical shell with flat bottom support plate, the two hemispherical shells connected together to surround the superconducting coils, the rotating magnetic wheel, and the high and low temperature heat extractor conduits and transfer plates, and wherein adjacent superconducting solenoidal coils in opposite pairs are connected to the top and bottom support plates and supported therefrom such that the coils in each pair are spaced away from each other on opposite sides of the rotating magnetic wheel and such that tne magnetic forces imposed on the superconducting magnets are transmitted to the support shells to tend to compress the support shells together.

11. The apparatus of claim 1 wherein the contained heat transfer gas is selected from helium 3 and helium 4.

12. The apparatus of claim 8 wherein tne superconducting coils are formed of $Nb_3Sn$.

13. Magnetic refrigeration apparatus comprising:
   (a) a magnetic wheel mounted for rotation about a central axis, the magnetic wheel including a plurality of flat rings of material which exhibits the magnetocaloric effect mounted to a surrounding holding rim which maintains the magnetic rings in spaced relation;
   (b) a high temperature heat extractor formed of a solid heat conducting material and including a plurality of heat transfer plates mounted to interleave with the magnetic rings of the magnetic wheel in the spaces between the rings to transfer heat from the rings to the heat transfer plates at a high temperature transfer region, and a high temperature transfer conduit extending from the heat transfer plates generally along the central axis to a high temperature interface terminal;
   (c) a low temperature heat extractor formed of a solid heat conducting material including a plurality of heat transfer plates mounted at a low temperature transfer region to interleave with the magnetic rings of the magnetic wheel in the spaces between the rings, and a heat transfer conduit extending from the heat transfer plates generally along the central axis to a low temperature interface terminal, the low temperature heat extractor being thermally isolated from the high temperature heat extractor;
   (d) means for driving the magnetic wheel about its axis of rotation;
   (e) means for containing a heat transfer gas in the space between the magnetic wheel rings and the heat transfer plates; and
   (f) means for producing a magnetic field passing through the portion of the magnetic wheel and heat transfer plates of the high temperature heat extractor at the high temperature transfer region, whereby as the magnetic wheel turns, heat is received by the material of the magnetic wheel from the heat transfer plates of the low temperature extractor at the low temperature transfer region and is released to the heat transfer plates of the high temperature extractor at the high temperature transfer region.

14. The apparatus of claim 13 wherein the high temperature heat extractor has a second set of heat transfer plates which extend outwardly from the central axis of the apparatus in a direction opposite to the first set of heat transfer plates to define a second high temperature transfer region, and wherein the low temperature extractor has a second set of heat transfer plates extending outwardly from the central axis of the apparatus opposite the first set of heat extractor plates to define a second low temperature heat transfer region, and wherein the means for producing a magnetic field produces a magnetic field through both high temperature heat transfer regions on the opposite sides of the central axis and substantially no magnetic field at the low temperature heat transfer regions.

15. The apparatus of claim 13 wherein the high and low temperature heat extractor conduits and heat transfer plates are formed of high purity copper.

16. The apparatus of claim 13 wherein the magnetic rings are divided circumferentially into numerous individual segments, each insulated from one another.

17. The apparatus of claim 13 wherein the material of the magnetic rings is gadolinium gallium garnet.

18. The apparatus of claim 14 wherein the means for producing the magnetic field includes two pairs of solenoidal coils formed of superconducting windings, the solenoidal coils of each pair disposed on opposite sides of the rotating magnetic wheel at the high temperature transfer regions, with the pairs being disposed on opposite sides of the axis of rotation of the wheel such that any portion of the magnetic wheel will be subjected to a magnetic field twice for each cycle of rotation of the wheel.

19. The apparatus of claim 18 including means for providing a heat conductive connection between the superconducting coils and the low temperature extractor conduit such that the superconducting coils are cooled by conduction through a solid material to the low temperature heat extractor conduit.

20. The apparatus of claim 18 including flux concentration bars of material having high magnetic permeability extending across the tops of the opposite pairs of solenoidal coils to provide a flux return path from one superconducting coil in a pair through the flux concentrating bar to a superconducting coil in the opposite pair and thence between the two superconducting coils in a pair through a flux concentrating bar across to the second superconducting coil of the first pair.

21. The apparatus of claim 18 including a support structure having a top hemispherical support shell with a flat top support plate, a bottom hemispherical shell with flat bottom support plate, the two hemispherical shells connected together to surround the superconducting coils, the rotating magnetic wheel and the high and low temperature heat extractor conduits and transfer plates, and wherein the adjacent superconducting solenoidal coils in opposite pairs are connected to the top and bottom support plates and are supported therefrom such that the coils in each pair are spaced away from each other on either opposite sides of the rotating magnetic wheel and such that the magnetic forces imposed on the superconducting magnets are transmitted to the support shells to tend to compress the support shells together.

22. The apparatus of claim 13 wherein the heat transfer gas is selected from helium 3 and helium 4.

23. The apparatus of claim 13 including means for maintaining the pressure of the helium when at a temperature in the range of 4K to 20K at a pressure in the range of 0.5 to 2.5 atmospheres.

24. The apparatus of claim 13 wherein the spacing between the heat transfer plates of the high and low temperature heat extractors and the magnetic rings is in the range of 1 to 20 thousandths of an inch.

25. The apparatus of claim 18 wherein the wires of the superconducting coils are formed of $Nb_3Sn$.

26. Magnetic refrigeration apparatus comprising:
(a) a magnetic wheel mounted for rotation about a central axis, the magnetic wheel including a plurality of flat rings of material which exhibits the magnetocaloric effect mounted to a surrounding holding rim which maintains the magnetic rings in spaced relation, the magnetic rings being divided circumferentially into numerous individual segments.
(b) a high temperature heat extractor formed of a conductive solid material and including first and second sets of heat transfer plates which extend outwardly from the central axis in opposite directions to interleave with the magnetic rings of the magnetic wheel in the spaces between the rings to transfer heat from the rings to the heat transfer plates at a high temperature transfer region, and a high temperature transfer conduit extending from the heat transfer plates generally along the central axis to a high temperature interface terminal;
(c) a low temperature heat extractor formed of a solid heat conducting material and including first and second sets of plural heat transfer plates extending outwardly from the central axis of the apparatus in opposite directions to define low temperature heat transfer regions at positions substantially perpendicular to the positions of the high temperature heat transfer plates, the plural low temperature heat transfer plates mounted to interleave with the magnetic rings of the magnetic wheel in the spaces between the rings, and a heat transfer conduit extending from the heat transfer plates generally along the central axis to a low temperature interface terminal, the low temperature heat extractor being thermally isolated from the high temperature heat extractor;
(d) means for driving the magnetic wheel about its axis of rotation;
(e) means for containing helium gas in the spaces between the magnetic wheel rings and the heat transfer plates; and
(f) two pairs of solenoidal coils formed of superconducting windings, the solenoidal coils of each pair disposed on opposite sides of the rotating magnetic wheel at the high temperature transfer regions, with the pairs being disposed on opposite sides of the axis of rotation of the wheel such that any portion of the magnetic wheel will be subjected to a magnetic field twice for each cycle of rotation of the wheel.

27. The apparatus of claim 26 wherein the high and low temperature heat extractor conduits and heat transfer plates are formed of high purity copper.

28. The apparatus of claim 26 including wedge plates mounted circumferentially between the high and low temperature heat transfer plates in stacked relation to interleave with the plural magnetic rings, the wedge plates being formed of a material which is a poor conductor of heat at the temperature at which the refrigerator is operated.

29. The apparatus of claim 28 wherein the insulating wedge plates are formed of stainless steel.

30. The apparatus of claim 26 wherein the material of the magnetic rings is gadolinium gallium garnet.

31. The apparatus of claim 26 including means for providing a heat conductive connection between the superconducting coils and the low temperature extractor conduit such that the superconducting coils are cooled by conduction through a solid material to the low temperature heat extractor conduit.

32. The apparatus of claim 26 including flux concentration bars of material having a high magnetic permeability extending across the tops of the opposite pairs of solenoidal coils to provide a flux return path from one superconducting coil in a pair through the flux concentrating bar to a superconducting coil in the opposite pair and thence between the two superconducting coils in a pair through a flux concentrating bar across to the second superconducting coil of the first pair.

33. The apparatus of claim 26 including means for selectively supplying energy to and withdrawing energy from the superconducting coils to charge and discharge the current in the coils by inductive coupling.

34. The apparatus of claim 26 including a support structure having a top hemispherical support shell with a flat top support plate, a bottom hemispherical shell with flat bottom support plate, the two hemispherical shells connected together to surround the superconducting coils, the rotating magnetic wheel, and the high and low temperature heat extractor conduits and transfer plates, and wherein the adjacent superconducting solenoidal coils in opposite pairs are connected to the top and bottom support plates and supported therefrom such that the coils in each pair are spaced away from each other on opposite sides of the rotating magnetic wheel and such that the magnetic forces imposed on the superconducting magnets are transmitted to the support shells to tend to compress the support shells together.

35. The apparatus of claim 26 wherein the helium gas is selected from helium 3 and helium 4.

36. The apparatus of claim 35 including means for maintaining the pressure of the helium when at a temperature in the range of 4K to 20K at a pressure in the range of 0.5 to 2.5 atmospheres.

37. The apparatus of claim 26 wherein the spacing between the heat transfer plates of the high and low temperature heat extractors and the magnetic rings is in the range of 1 to 20 thousandths of an inch.

38. The apparatus of claim 26 wherein the wires of the superconducting coils are formed of $Nb_3Sn$.

39. A method of cooling down a magnetic refrigerator of the type having a magnetic wheel of material which exhibits the magnetocaloric effect mounted for rotation about a central axis, at least one superconducting magnet coil mounted at a position over a portion of the magnetic wheel such that the material at each point of the magnetic wheel moves into and out of the magnetic field from the coil as the wheel rotates, a low temperature heat extractor including a solid conductive heat transfer conduit extending from a heat transfer plate adjacent to the magnetic wheel at a position on the wheel outside of the magnetic field from the coil, and means for containing helium gas in the space between the magnetic wheel and the heat transfer plate such that heat is transferred from the heat transfer plate of the low temperature extractor to the magnetic wheel through the gas, comprising the steps of:

(a) cooling the superconducting coil to a temperature below its zero field critical temperature;

(b) inducing a current in the superconducting coil at a current level which produces a magnetic field from the superconducting coil at a field strength below the critical field of the coil at the temperature of the coil;

(c) rotating the magnetic wheel to draw heat from the superconducting coil through the low temperature heat extractor and the heat transfer plate thereof to the magnetic wheel to bring the coil down to a lower temperature; and (d) inducing a higher current level in the coil to produce a higher field strength in the superconducting coil which is below the critical field strength at the lower temperature to which the coil has been cooled.

40. The method of claim 39 wherein steps (c) and (d) are repeated sequentially until a desired minimum low temperature at the low temperature heat extractor is obtained.

41. The method of claim 39 wherein the superconducting coil is formed of $Nb_3Sn$ and wherein in the step of cooling the coil to a temperature below its zero field critical temperature, the coil is cooled to a temperature below 18K.

42. The method of claim 39 wherein the steps of inducing current in the coil is performed by inductively coupling a superconducting loop connected to the superconducting coil to an external primary winding to increase the current level in the coil by flux pumping.

43. The method of claim 39 including the additional step of providing a permanent magnetic field through the magnetic wheel at a position adjacent to the superconducting coil, and wherein the step of cooling the coil to a temperature below its zero field critical temperature includes the steps of cooling the coil from an external source to a temperature above but near its zero field critical temperature and rotating the magnetic wheel through the permanent magnetic field to draw heat from the superconducting coil through the low temperature heat extractor and from the low temperature heat transfer plate to the magnetic wheel until the coil is cooled below its zero field critical temperature.

* * * * *